(12) United States Patent
Kobayashi et al.

(10) Patent No.: US 8,962,756 B2
(45) Date of Patent: Feb. 24, 2015

(54) POLYMER ALLOY, PROCESS FOR PRODUCING SAME, AND MOLDED ARTICLE

(75) Inventors: Sadayuki Kobayashi, Nagoya (JP); Shinichiro Ochiai, Nagoya (JP)

(73) Assignee: Toray Industries, Inc. (JP)

( * ) Notice: Subject to any disclaimer, the term of this patent is extended or adjusted under 35 U.S.C. 154(b) by 434 days.

(21) Appl. No.: 13/386,511

(22) PCT Filed: Jul. 15, 2010

(86) PCT No.: PCT/JP2010/061941
§ 371 (c)(1),
(2), (4) Date: Jan. 23, 2012

(87) PCT Pub. No.: WO2011/013517
PCT Pub. Date: Feb. 3, 2011

(65) Prior Publication Data
US 2012/0123056 A1 May 17, 2012

(30) Foreign Application Priority Data

Jul. 29, 2009 (JP) .................................. 2009-176343
Nov. 30, 2009 (JP) .................................. 2009-272263

(51) Int. Cl.
*B29B 7/48* (2006.01)
*C08J 3/00* (2006.01)
*C08J 3/20* (2006.01)
*B29C 47/38* (2006.01)
*B29C 47/60* (2006.01)

(52) U.S. Cl.
CPC ... *C08J 3/20* (2013.01); *B29B 7/48* (2013.01); *B29C 47/385* (2013.01); *B29C 47/6056* (2013.01); *B29C 47/6087* (2013.01); *C08J 2300/00* (2013.01)
USPC .......... 525/133; 525/132; 525/148; 525/394; 525/397; 525/462

(58) Field of Classification Search
None
See application file for complete search history.

(56) References Cited

U.S. PATENT DOCUMENTS

| | | | |
|---|---|---|---|
| 3,306,874 A | | 2/1967 | Hay |
| 5,551,777 A | * | 9/1996 | Tjahjadi et al. ............... 366/100 |
| 2002/0053753 A1 | | 5/2002 | Zumbrunnen et al. |
| 2005/0080197 A1 | * | 4/2005 | Jana et al. ..................... 525/240 |
| 2014/0107273 A1 | * | 4/2014 | Ochiai et al. .................. 524/451 |

FOREIGN PATENT DOCUMENTS

EP      147874      *  7/1985

OTHER PUBLICATIONS

Jana, Chaotic Mixing: A New Technology for Polymer Blending; International Journal of Plastics vol. 6 (2003) p. 88-92.*
Macaubus, Morphologies and Interfacial Tensions of Immiscible Polypropylene/Polystyrene Blends . . . ;Polymer 42 (2001) pp. 2543-2554.*
Boyd, Silent Discharge Treament of Immiscible Polystyrene/Polycarbonate Polymer Blend Surfaces; Macromolecules 30 (1997) pp. 3658-3663.*
Zumbrunnen, D.A., "Saishin no Ryutai Rikigaku o Oyo shita Shinki Tamokuteki Polymer Blend Gijutsu—Chaos Kongo Gijutsu" *Plastic Age*, Jun. 1, 2007, vol. 53, No. 6, pp. 76-85. English Translation: "Chaotic Blending: A New Versatile Polymer Blending Techonogy Based on Recent Advances in Fluid Mechanics," pp. 1-31.
J.M. Ottino et al., "Chaotic Mixing Processes: New Problems and Computational Issues," Chaos, Solitons & Fractals, vol. 6, 1995, pp. 425-438.
P. Wapperom et al., "The backward-tracking Lagrangian particlemethod for transient viscoeleastic flows," Journal of Non-Newtonian Fluid Mechanics, vol. 91, 2000, pp. 273-295.
D.A. Zumbrunnen et al., "Morphology development in polymer blends produced by chaotic mixing at various compositions," Polymer, vol. 43, 2002, pp. 3267-3277.
Polymer Alloys and Blends, Leszek A Utracki, hanser Publishers, Munich Viema New York, p. 64.

* cited by examiner

*Primary Examiner* — David Buttner
(74) *Attorney, Agent, or Firm* — DLA Piper LLP (US)

(57) ABSTRACT

At least two or more components of thermoplastic resins are compounded by chaotic mixing to form a polymer alloy with a sophisticatedly controlled dispersed phase structure. In the polymer alloy, a dispersed phase having a non-periodic structure with a correlation length of 0.001 μm to 0.5 μm and having a compactness (C) of $0.05 \leq (C) \leq 0.8$, wherein the compactness (C) can form a molded product that also has transparency while maintaining the original good heat resistance or mechanical properties of the resins blended.

3 Claims, 4 Drawing Sheets a b c

POLYMER ALLOY, PROCESS FOR PRODUCING SAME, AND MOLDED ARTICLE

RELATED APPLICATIONS

This is a §371 of International Application No. PCT/JP2010/061941, with an international filing date of Jul. 15, 2010 (WO 2011/013517 A1, published Feb. 3, 2011), which is based on Japanese Patent Application Nos. 2009-176343, filed Jul. 29, 2009, and 2009-272263, filed Nov. 30, 2009, the subject matter of which is incorporated by reference.

TECHNICAL FIELD

This disclosure relates to polymer alloys and methods for production thereof. More specifically, the disclosure relates to a polymer alloy that has good heat resistance and mechanical properties, can be effectively used as a structural material, has high transparency, and can be effectively used as a transparent material, and to a method for producing such a polymer alloy.

BACKGROUND

Polymer alloys composed of two resin components include an immiscible blend, a miscible blend, and a partially miscible blend. In a miscible blend, two resin components are miscible with each other in the practical range from the glass transition temperature to the thermal decomposition temperature. In an immiscible blend, two resin components are immiscible with each other over the range. In a partially miscible blend, two resin components are miscible with each other in a certain range but are in a phase separation state in a different range so that spinodal decomposition occurs. In general, miscible-type polymer alloys often have intermediate properties between those of resin components blended, because the components are dissolved in molecular order to each other. To take advantage of the properties of two resin components, therefore, studies on immiscible or partially miscible-type polymer alloys have been actively conducted.

Japanese Patent Application Laid-Open (JP-A) No. 2003-286414 discloses that a both-phase continuous structure with a structure cycle of 0.001 to 1 μm or a dispersion structure with an inter-particle distance of 0.001 to 1 μm is formed through spinodal decomposition using polycarbonate resin and polybutylene terephthalate resin, so that mechanical strength is improved. The method disclosed in JP '414 includes making polycarbonate resin and polybutylene terephthalate resin miscible with each other by applying shearing to them in an extruder, and then allowing spinodal decomposition to occur to form an alloy structure. The method disclosed in JP '414 has the limit that when a combination of generally immiscible resins is used, it is impossible to form a both-phase continuous structure with a structure cycle of 0.001 to 1 μm or a dispersion structure with an inter-particle distance of 0.001 to 1 μm. The method disclosed in JP '414 also has a problem in which it is difficult to uniformly apply shearing, so that the dispersed phase uniformity is low.

International Patent Application Publication No. 2009/041335 discloses that a polymer alloy composed of thermoplastic resin components and having a fine and uniformly controlled structure is obtained by a process including: providing an oligomer or a monomer as a precursor of at least one of the thermoplastic resin components so that the remaining thermoplastic resin component provided is miscible with the oligomer or the monomer; and inducing spinodal decomposition by chemical reaction in the coexistence of two resins. Further, in the method disclosed in WO '335, a precursor of at least one thermoplastic resin component and the remaining thermoplastic resin component must be miscible with each other. Therefore, it has the limit that a both-phase continuous structure with a structure cycle of 0.001 to 1 μm or a dispersion structure with an inter-particle distance of 0.001 to 1 μm cannot be formed using a combination of immiscible resins.

On the other hand, concerning immiscible-type polymer alloy, which generally has spherical dispersed particles with a size of 1 μm or more, attempts to reduce the dispersed particle size have also been made in recent years.

JP-A No. 2009-46641 discloses that when an immiscible polymer alloy composed of polyether imide resin and polyphenylene sulfide resin is produced, the number average particle size of the dispersed particles is reduced to 1,000 nm or less by increasing the shear force during compounding process or by adding a compatibilizer, so that the toughness is improved. The method disclosed in JP '641, in which the resulting structure contains spherical dispersed particles, is not sufficiently effective in improving heat resistance.

It could therefore be helpful to provide polymer alloys that also have transparency while maintaining the original good heat resistance and mechanical properties of the resins blended.

SUMMARY

We provide a method for producing a polymer alloy, which includes compounding at least two or more components of thermoplastic resins by chaotic mixing.

We also provide a polymer alloy obtained by compounding at least two or more components of thermoplastic resins, which includes a dispersed phase having a non-periodic structure with a correlation length of 0.001 μm to 0.5 μm and having a compactness (C) of 0.05 to 0.8 (0.05≤(C)≤0.8), wherein the compactness (C) is defined by following formula (1):

$$C=4\pi S/L^2 \qquad \text{Formula (1)}$$

wherein (S) represents the area of the dispersed phase, and (L) represents the circumference length of the dispersed phase.

We further provide a polymer alloy obtained by compounding at least two or more components of immiscible thermoplastic resins, which includes a dispersion structure having particles with an average particle size of 0.001 to 1 μm dispersed therein and satisfying $$0<(a)/(b)\leq 1.5$$

wherein (a) and (b) represent a peak half width and the maximum wavenumber of the peak, respectively, in a spectrum obtained by plotting scattering intensity against wavenumber of scattered light in scattering measurement.

The polymer alloy can form a molded product that also has transparency while maintaining the original good heat resistance and mechanical properties of the resins blended. Taking advantage of a high level of heat resistance, mechanical properties, and transparency, therefore, the polymer alloy can be effectively used to form a variety of molded products. For example, taking full advantage of the characteristics of polymethylene methacrylate resin and highly-heat-resistant polycarbonate resin, the polymer alloy can also form a transparent molded product with improved heat resistance in a wide composition range which would otherwise be impossible to obtain using conventional techniques. Further, for example, taking full advantage of the characteristics of acrylonitrile/ styrene copolymer and highly-heat-resistant polycarbonate resin, the polymer alloy can also form a transparent molded product with improved heat resistance in a wide composition range, which would otherwise be impossible to obtain using conventional techniques.

DETAILED DESCRIPTION

Figure 1:
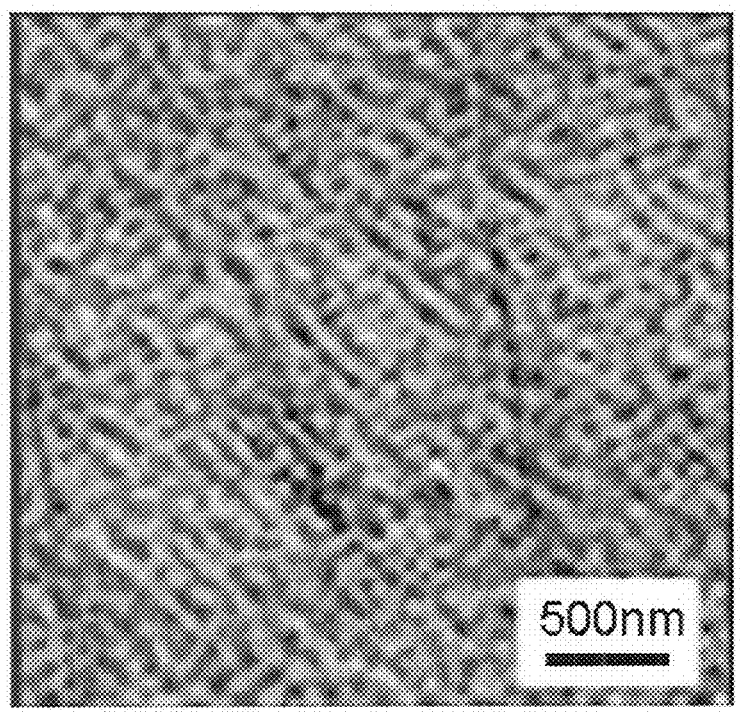
FIG. 1 is a transmission electron micrograph of Example 2.

Hereinafter, our polymer alloys, methods and molded products are described in more detail.

Our method for producing a polymer alloy includes compounding at least two or more components of thermoplastic resins by chaotic mixing.

In general, low-viscosity fluid such as water can undergo efficient mixing when the flow is made turbulent. When high-viscosity fluid is subjected to mixing, it is difficult to make the flow turbulent so that uniform mixing can be achieved, because a large amount of energy is needed to produce turbulence. In the field of chemical engineering, studies have been made on how to achieve efficient and uniform mixing in a laminar flow state, and in recent years, studies on chaotic mixing have been advanced.

Chaotic mixing will be described. In the context of mixing two fluids, the positions of all points on the interface between the initial two fluids can be set as initial values, and the equation to determine the movement of the fluid particles can be solved so that the time evolution of the interface can be determined. To mix two fluids quickly, the interface should be folded at small intervals, which means that the area of the interface should be increased sharply, and therefore, the distance between two points very close to each other on the initial interface should be increased sharply. Concerning the solutions of the equation to determine the movement of fluids, therefore, mixing can have a chaotic solution in which the distance between two points exponentially increases with time. Such mixing is called chaotic mixing. For example, chaotic mixing is described in Chaos, Solitons & Fractals Vol. 6 p 425-438.

Chaotic mixing has been used to mix fluids such as liquids. We found that chaotic mixing is also effective in compounding resins. A method for compounding resins by chaotic mixing may be performed using a known mixing machine commonly used, such as a kneader, a roll mill, a Banbury mixer, or a mono-screw or twin-screw extruder. Particularly in view of productivity, a mono-screw or twin-screw extruder is preferably used, and a twin-screw extruder is most preferably used. In the process of compounding resins, decreasing the kneading temperature, increasing the melt viscosity, and using a screw that is effective in producing a chaotic mixing state make it possible to produce chaotic mixing in which alloy components are repeatedly stretched and folded.

The temperature of compounding by chaotic mixing, which depends on the combination of the resins to be used, is preferably set 1 to 70° C. higher than, more preferably 5 to 65° C. higher than the glass transition temperature of a resin, which has the highest glass transition temperature among the resins used. If the compounding temperature is set less than 1° C. higher than the glass transition temperature of the highest-glass-transition-temperature resin used, it may have too high viscosity to be molten and kneaded, and if the compounding temperature is set in the range more than 70° C. higher than the glass transition temperature, stretching of the alloy components may be insufficient so that a chaotic mixing state may fail to be reached, which is not preferred.

Chaotic mixing is preferably such that the logarithm of the hypothetical elongation: $(\ln L/L_0)$, wherein $(L)$ and $(L_0)$ represent the length of a line and the initial length of the line, respectively, in a particle tracking method, is 2 or more. The higher logarithm $(\ln L/L_0)$ of the hypothetical elongation means that concerning the solutions of the equation to determine the movement of fluids, the distance between two points is more likely to exponentially increase with time. Such a particle tracking method includes randomly determining the initial positions of 1,000 particles at the time t=0 in a cross-section upstream of the screw to be evaluated, and tracking, by simulation, the movement associated with the velocity field calculated by analysis on the screw to be evaluated, in which the logarithm of the hypothetical elongation: $(\ln L/L_0)$, wherein $(L)$ and $(L_0)$ represent the length of a line and the initial length of the line, respectively, can be calculated from the recorded coordinate values of each particle. For example, the particle tracking method is described in Journal of Non-Newtonian Fluid Mechanics Vol. 91, Issues 2-3, 1 Jul. 2000, p 273-295.

A screw effective for producing a chaotic mixing state is preferably designed so that the logarithm of the hypothetical elongation. $(\ln L/L_0)$, wherein $(L)$ and $(L_0)$ represent the length of a line and the initial length of the line, respectively, in a particle tracking method, can be 2 or more, more preferably 3 or more, most preferably 4 or more.

It is preferred to use a screw effective for producing a chaotic mixing state. A twin-screw extruder screw effective for producing a chaotic mixing state may include a twist kneading disk having a spiral angle θ of more than 0° to less than 90° (0°<θ<90°) in the half-rotation direction of the screw, wherein the spiral angle θ is the angle between the apex on the front end side of the kneading disk and the apex on the rear face side. Back-mixing screws each including a flight screw having a resin passageway formed in the flight part from the front end to the rear end of the screw, and twist kneading disks may also be alternately arranged to produce chaotic mixing more effectively.

A twin-screw extruder is preferably used to perform compounding by chaotic mixing. When an extruder is used to perform compounding, the total length of zones where compounding are performed while chaotic mixing is achieved (chaotic mixing zones) is preferably from 5 to 80%, more preferably from 10 to 70%, even more preferably from 15 to 60% of the entire length of the screw in the extruder. Zones (chaotic mixing zones) where compounding are performed while chaotic mixing is achieved in a twin-screw extruder are preferably not localized at specific positions in the screw but placed over the whole area.

It is preferred that alloy components are repeatedly stretched and folded by chaotic mixing to form a polymer alloy. Chaotic mixing makes it possible to form a polymer alloy having a fine dispersed phase, preferably having a characteristic non-periodic structure with a dispersed phase correlation length of 0.001 μm to 0.5 μm in some cases. As used herein, the term "dispersed phase" refers to a structure in which the component with the highest content in the resin composition forms a sea phase (continuous phase or matrix) while other resin components form an island phase (dispersed phase). The term "non-periodic structure" means that no regular periodic structure is found, for example, which can be confirmed by the fact that no periodic structure is observed by optical or electron microscopy.

Thermoplastic resins are resins capable of being molded by heating and melting. For example, the resin is at least one selected from polyamide resin, polyester resin, polyphenylene sulfide resin, polyacetal resin, polycarbonate resin, polyphenylene oxide resin, polylactic acid resin, polysulfone resin, polytetrafluoroethylene resin, polyether imide resin, polyamide imide resin, polyimide resin, polyether sulfone resin, polyether ketone resin, polythioether ketone resin, polyether ether ketone resin, polyethylene resin, polypropylene resin, poly(methyl methacrylate) resin, styrene resin such as polystyrene resin or ABS resin, gum polymer, polyalkylene oxide resin, and the like.

At least one of the components is preferably amorphous resin capable of maintaining high viscosity, and more preferably, at least two components are amorphous resins. From this point of view, the resin is preferably at least one selected from polycarbonate resin, polyphenylene oxide resin, polysulfone resin, polyether imide resin, polyether sulfone resin, poly(methyl methacrylate) resin, and styrene resin such as polystyrene resin or ABS resin.

At least two or more components of thermoplastic resins are preferably two or more immiscible thermoplastic resins. Two or more immiscible thermoplastic resins correspond to a combination of thermoplastic resins that are immiscible with one another over the practical range of from the glass transition temperature to the thermal decomposition temperature. Specifically, they correspond to a combination of thermoplastic resins capable of forming phase structures of 0.001 µm or more, respectively, composed mainly of two or more different resin components. For example, whether or not resins form a miscible blend can be determined as described in Polymer Alloys and Blends, Leszek A Utracki, hanser Publishers, Munich Viema New York, P64 using an electron microscope, a differential scanning colorimeter (DSC), or other various methods. Specifically, if a single glass transition temperature is detected in the measurement of the respective thermoplastic resins with a differential scanning colorimeter (DSC), it can be determined that they are miscible, and if different glass transition temperatures are observed, it can be determined that a combination of the thermoplastic resins are immiscible.

To produce a polymer alloy with good heat resistance, amorphous resins with high glass transition temperatures are preferably used, examples of which include polycarbonate resins, polyphenylene oxide resins, polysulfone resins, polyether imide resins, polyether sulfone resins, and the like, as a preferable amorphous resin.

Preferred examples of a combination of thermoplastic resins include a combination of polycarbonate and poly(methyl methacrylate) resins, a combination of polycarbonate and polyphenylene oxide resins, a combination of polyphenylene oxide and poly(methyl methacrylate) resins, a combination of polycarbonate and polyamide resins, a combination of polycarbonate and polyester resins, a combination of polycarbonate and polyphenylene sulfide resins, a combination of polycarbonate and polylactic acid resins, a combination of polycarbonate and ABS resins, a combination of polyphenylene oxide and polyamide resins, a combination of polyphenylene oxide and polyester resins, a combination of polyphenylene oxide and polyphenylene sulfide resins, a combination of polyphenylene oxide and polylactic acid resins, a combination of polyphenylene oxide and ABS resins, a combination of polysulfone and polyamide resins, a combination of polysulfone and polyester resins, a combination of polysulfone and polyphenylene sulfide resins, a combination f polysulfone and polylactic acid resins, a combination of polysulfone and ABS resins, a combination of polyether imide and polyamide resins, a combination of polyether imide and polyester resins, a combination of polyether imide and polyphenylene sulfide resins, a combination of polyether imide and polylactic acid resins, a combination of polyether imide and ABS resins, a combination of polyether sulfone and polyamide resins, a combination of polyether sulfone and polyester resins, a combination of polyether sulfone and polyphenylene sulfide resins, a combination of polyether sulfone and polylactic acid resins, a combination of polyether sulfone and ABS resins, and the like.

Preferred examples of the polycarbonate resin include polycarbonate resins produced using, as a main raw material, at least one dihydroxy compound selected from bisphenol A, namely, 2,2'-bis(4-hydroxyphenyl)propane, 4,4'-dihydroxydiphenylalkane, 4,4'-dihydroxydiphenylsulfone, or 4,4'-dihydroxydiphenyl ether. In particular, polycarbonate resins produced using bisphenol A, namely, 2,2'-bis(4-hydroxyphenyl)propane as a main raw material are preferred. More specifically, polycarbonates obtained by a transesterification or phosgene process using a dihydroxy component such as bisphenol A are preferred. The dihydroxy compound such as bisphenol A may also be used in combination with any other dihydroxy compound copolymerizable therewith, such as 4,4'-dihydroxydiphenylalkane, 4,4'-dihydroxydiphenylsulfone, or 4,4'-dihydroxydiphenyl ether. The amount of any other dihydroxy compound used is preferably 10% by mole or less, based on the total amount of the hydroxy compounds.

In view of high impact resistance and moldability, the polycarbonate resin preferably has a specific viscosity in the range of 0.1 to 2.0, in particular, preferably in the range of 0.5 to 1.5, most preferably in the range of 0.8 to 1.5, as measured with respect to a solution of 0.7 g of the polycarbonate resin in 100 ml of methylene chloride at 20° C.

Examples of the polyphenylene oxide resin include poly(2,6-dimethyl-1,4-phenylene oxide), poly(2-methyl-6-ethyl-1,4-phenylene oxide), poly(2,6-diphenyl-1,4-phenylene oxide), poly(2-methyl-6-phenyl-1,4-phenylene oxide), poly(2,6-dichloro-1,4-phenylene oxide), and the like. Examples further include copolymers such as copolymers of 2,6-dimethylphenol and any other phenols (such as 2,3,6-trimethylphenol). In particular, poly(2,6-dimethyl-1,4-phenylene oxide) and a copolymer of 2,6-dimethylphenol and 2,3,6-trimethylphenol are preferred, and poly(2,6-dimethyl-1,4-phenylene oxide) is particularly preferred.

The polyphenylene oxide resin suitably has a reduced viscosity in the range of 0.15 to 0.70 as measured at 30° C. (0.5 g/dl chloroform solution).

The method for producing the polyphenylene oxide resin is not restricted, and polyphenylene oxide resin obtained by any known method may be used. For example, the polyphenylene oxide resin can be easily produced by oxidation polymerization using, as a catalyst, the copper (I)-amine complex disclosed in U.S. Pat. No. 3,306,874 by Hay. It will be understood that the polyphenylene oxide resin obtained as described above may be subjected to any of various treatments, such as modification or activation with a compound containing a functional group such as an acid anhydride group, an epoxy group, or an isocyanate group, before it is used.

The poly(methyl methacrylate) resin includes a poly(methyl methacrylate) obtained using methyl methacrylate as a vinyl monomer, which may also be a copolymer of methyl methacrylate and any other vinyl monomer. Examples of other vinyl monomers include aromatic vinyl monomers such as α-methylstyrene, o-methylstyrene, p-methylstyrene, o-ethylstyrene, p-ethylstyrene, and p-tert-butylstyrene, cyanided vinyl monomers such as acrylonitrile, methacrylonitrile, and ethacrylonitrile, glycidyl itaconate, ally glycidyl ether, styrene-p-glycidyl ether, p-glycidylstyrene, maleic anhydride, monoethyl maleate, itaconic acid, itaconic anhydride, phthalic acid, N-substituted maleimide such as N-methylmaleimide, N-ethylmaleimide, N-cyclohexylmaleimide, and N-phenylmaleimide, acrylamide, methacrylamide, N-methylacrylamide, butoxymethylacrylamide, N-propylmethacrylamide, acrylic acid, methyl acrylate, ethyl acrylate, aminoethyl acrylate, propylaminoethyl acrylate, methacrylic acid, cyclohexyl methacrylate, dimethylaminoethyl methacrylate, ethylaminopropyl methacrylate, phenylaminoethyl methacrylate, cyclohexylaminoethyl methacrylate, methyl 2-(hydroxymethyl)acrylate, ethyl 2-(hydroxymethyl)acrylate, butyl 2-(hydroxymethyl)acrylate, N-vinyldiethylamine, N-acetylvinylamine, allylamine, methallylamine, N-methylallylamine, p-aminostyrene, 2-isopropenyl-oxazoline, 2-vinyl-oxazoline, 2-acryloyl-oxazoline, 2-styryl-oxazoline, and the like. These vinyl monomers may be used alone or in combination of two or more. In view of heat resistance, the poly(methyl methacrylate) copolymer is preferably a copolymer containing a ring structure unit such as maleic anhydride, glutaric anhydride, or a maleimide ring in the main chain, which is more preferably used in combination with poly (methyl methacrylate). Such a poly(methyl methacrylate) copolymer may be produced according to known methods. In the copolymer, the amount of other vinyl monomer units is preferably 30% by mole or less, more preferably 20% by mole or less.

The poly(methyl methacrylate) resin preferably includes at least one poly(methyl methacrylate) having a weight average molecular weight of 50,000 to 450,000, a glass transition temperature of 80° C. or more, and a syndiotacticity of 40% or more.

While the composition of two or more thermoplastic resin components is not restricted, the weight ratio (A)/(B) of the resin component (A) with the highest content to the resin component (B) with the second highest content in the resin composition is preferably from 90/10 to 50/50, more preferably from 80/20 to 50/50, in particular, preferably from 70/30 to 50/50.

Next, the polymer alloy will be described.

We provide a polymer alloy obtained by compounding at least two or more components of thermoplastic resins which comprises a dispersed phase having a non-periodic structure with a correlation length of 0.001 μm to 0.5 μm and having a compactness (C) of 0.05 to 0.8 (0.05≤(C)≤0.8), wherein the compactness (C) is defined by the following formula (1):

$$C = 4\pi S/L^2 \quad \text{Formula (1)}$$

wherein (S) represents the area of the dispersed phase, and (L) represents the circumference length of the dispersed phase.

A polymer alloy has properties superior to those of a single resin because the advantages are derived from the respective raw material resins while the disadvantages are compensated for. An important thing for this is the correlation length of the dispersed phase of the polymer alloy. If the correlation length is too long, the mechanical properties may be significantly reduced, and if the correlation length is too short, the properties of material resins may be lost, which is not preferred. Therefore, the correlation length of the non-periodic structure is preferably from 0.001 μm to 0.5 μm, more preferably from 0.01 μm to 0.4 μm, even more preferably from 0.02 μm to 0.3 μm, most preferably from 0.05 μm to 0.2 μm.

The correlation length is an indicator of the size of the dispersed phase of a structure in which the regular circumference structure is not found. The correlation length can be calculated by a process including making a Debye plot of reciprocal of scattering intensity versus wavenumber based on a scattering profile obtained by light scattering or small-angle X-ray scattering and determining the correlation length from the square root of the quotient obtained by dividing the slope of the Debye plot by the intercept. The polymer alloy with a correlation length of 0.001 μm to less than 0.1 μm can be evaluated by small-angle X-ray scattering, and the polymer alloy with a correlation length of 0.1 μm to 0.5 μm can be evaluated by light scattering measurement. Small-angle X-ray scattering and light scattering, which differ in analyzable structure size, should be properly used depending on the structural size of the polymer alloy to be analyzed.

In the light scattering or small-angle X-ray diffraction measurement, the sample should be in the form of a thin film. Such a thin film can be formed by slicing with a microtome or the like or by heat pressing. When a light scattering device is used, the thin film sample can be easily obtained by heat-pressing a polymer alloy sandwiched between about 0.1 mm thick cover glasses. In the case of small-angle X-ray diffraction, it should be noted that cover glasses absorb X-rays. In the case of heat pressing, too much heating or pressing for a long time may produce a coarse structure, depending on the sample, and therefore, the pressing conditions should be carefully determined. When crystalline resin is used, the alloy structure may be changed by crystallization, and therefore, rapid cooling is performed to fix the structure after the heat pressing.

The sample prepared in the form of a thin film is measured at the central portion. If the sample is too large relative to the size of the sample holder of the measuring device, a part is cut from the center area of the sample and measured. The thickness of the sample is controlled to be optimum by stacking two or more sample pieces so that the intensity of the resulting signal can be as high as possible. The signal intensity increases in proportion to the sample thickness, while the absorption of measuring light exponentially increases with the sample thickness according to Lambert-Beer's law, so that the signal intensity decreases accordingly. Therefore, the thickness of the sample should be determined depending on the balance between them.

A polymer alloy composed of a combination of polymers with a small difference in refractive index is difficult to measure because of its small signal intensity. In such a case, an optional treatment with a staining reagent such as iodine, $RuO_4$, or $OsO_4$ is also effective.

The polymer alloy has a structure in which the dispersed phase has a compactness (C) of 0.05 to 0.8 (0.05≤(C)≤0.8), wherein the compactness (C) is defined by the following formula (1):

$$C = 4\pi S/L^2 \quad \text{Formula (1)}$$

wherein (S) represents the area of the dispersed phase, and (L) represents the circumference length of the dispersed phase.

The compactness (C) of the dispersed phase is an indicator of the structure of the dispersed phase. A compactness (C) close to 1 indicates that the dispersed phase is close to a sphere, and contrarily, a compactness (C) close to 0 indicates that the dispersed phase greatly varies in shape. The compactness is preferably $$0.05 \leq (C) \leq 0.6$$

more preferably $$0.1 \leq (C) \leq 0.5.$$

As the compactness (C) decreases, the area of the interface between the dispersed phase and the continuous phase increases, so that the excellent properties of the dispersed phase can be expressed as much as possible, which makes it possible to obtain a polymer alloy with very good properties.

The area (S) of the dispersed phase and the circumference length (L) of the dispersed phase can be determined by a process including cutting an ultra-thin section from a block piece of a polymer alloy at a depth of 1 mm from the surface and observing the section with a transmission electron microscope at a magnification of 120,000 times. 100 parts of the dispersed phase to be observed by the above measurement method were randomly selected, and the compactness (C) of each part was calculated from the area (S) and the circumference length (L) of the dispersed phase using image analysis software Scion Image, and the average was calculated.

Another polymer alloy is obtained by compounding or more components of immiscible thermoplastic resins which comprises a dispersion structure having particles with an average particle size of 0.001 to 1 μm dispersed therein and satisfying $$0 < (a)/(b) \leq 1.5$$

wherein (a) and (b) represent a peak half width and the maximum wavenumber of the peak, respectively, in a spectrum obtained by plotting scattering intensity against wavenumber of scattered light in scattering measurement.

A polymer alloy has properties superior to those of a single resin because the advantages are derived from the respective raw material resins while the disadvantages are compensated for. Important things for this are the size and uniformity of particles in the dispersion structure. If the size is too large, the physical properties of each raw material may only be expressed so that it may be difficult to compensate for the disadvantages. If the size is too small, the properties of the raw resin materials may be lost. The particles dispersed in the another polymer alloy have an average particle size of 0.001 μm to 1 μm, preferably 0.001 μm to 0.8 μm, more preferably 0.001 μm to 0.6 μm.

As used herein, the term "average particle size" refers to the number average particle size of major axes determined in an electron micrograph which can be calculated by image analysis. Alternatively, the major axis of 50 particles may be directly measured in a micrograph, and the number-average value may be calculated.

For example, the average particle size may be determined by observation of a sample, which is cut from a pellet, a press-molded product, a film, a sheet, or an injection-molded product, with an optical microscope or a transmission electron microscope.

When alloy components are repeatedly stretched and folded by chaotic mixing in the process of compounding, two or more immiscible polymer alloy components can form a fine dispersed phase, and the phase structure can have a characteristic dispersion structure in which particles with an average particle size of 0.001 to 1 μm dispersed in the polymer alloy are controlled to have high uniformity.

Even though the average particle size is from 0.001 to 1 μm, if there is a structurally coarse part, destruction may proceed from such a part as a starting point, for example, upon receiving impact so that the original properties of the polymer alloy may fail to be obtained. Therefore, the uniformity of particles dispersed in the polymer alloy is important. When the polymer alloy has an average particle size of 0.001 μm to less than 0.1 μm, the uniformity can be evaluated by small-angle X-ray scattering measurement. When the polymer alloy has an average particle size of 0.1 μm to 1 μm, the uniformity can be evaluated by light scattering measurement. Small-angle X-ray scattering and light scattering, which differ in analyzable structure size, should be properly used depending on the dispersion structure size of the polymer alloy to be analyzed. Information about the distribution can be obtained by small-angle X-ray scattering measurement and light scattering measurement and, specifically, how wide the scattering maximum peak is in the spectrum obtained by these measurements corresponds to the particle size uniformity.

The half-value width of the scattering maximum peak is noted as an indicator of uniformity in the spectrum obtained by plotting scattering intensity against wavenumber of scattered light in the small-angle X-ray scattering measurement of the polymer alloy with an average particle size of 0.001 μm to less than 0.1 μm or in the light scattering measurement of the polymer alloy with an average particle size of 0.1 μm to 1 μm. The peak half width tends to increase as the maximum wavenumber of the peak increases. Therefore, the value (a)/(b) calculated from the peak half width (a) and the maximum wavenumber (b) of the peak is used as an indicator of particle size uniformity. High particle size uniformity is preferred for good physical properties such as good mechanical properties.

The another polymer alloy satisfies $$0 \leq (a)/(b) \leq 1.5$$

preferably $$0 \leq (a)/(b) \leq 1.4$$

more preferably $$0 \leq (a)/(b) \leq 1.3$$

wherein (a) and (b) represent a peak half width and the maximum wavenumber of the peak, respectively, in a spectrum obtained by plotting scattering intensity against wavenumber of scattered light in scattering measurement.

The peak half width corresponds to the width of a peak measured at the midpoint (point C) of a line segment between (point A) and (point B), wherein (point A) is the apex of the peak, and (point B) is an intersection point of the base line of the spectrum and a straight line drawn parallel to the vertical axis of the graph from the apex of the peak (point A). As used herein, the term "the width of a peak" refers to the width on a straight line being parallel to the base line and passing through (point C).

In the light scattering or small-angle X-ray diffraction measurement, the sample should be in the form of a thin film. Such a thin film can be formed by slicing with a microtome or the like or by heat pressing. When a light scattering device is used, the thin film sample can be easily obtained by heat-pressing a polymer alloy sandwiched between about 0.1 mm thick cover glasses. In the case of small-angle X-ray diffraction, it should be noted that cover glasses absorb X-rays. In the case of heat pressing, too much heating or pressing for a long time may produce a coarse structure, depending on the sample and, therefore, the pressing conditions should be carefully determined. When crystalline resin is used, the alloy structure may be changed by crystallization and, therefore, rapid cooling should be performed to fix the structure after the heat pressing.

The sample prepared in the form of a thin film is measured at the central portion. If the sample is too large relative to the size of the sample holder of the measuring device, a part is cut from the center area of the sample and measured. The thickness of the sample is controlled to be optimum by stacking two or more sample pieces so that the intensity of the resulting signal can be as high as possible. The signal intensity increases in proportion to the sample thickness, while the absorption of measuring light exponentially increases with the sample thickness according to Lambert-Beer's law so that the signal intensity decreases accordingly. Therefore, the thickness of the sample should be determined depending on the balance between them.

A polymer alloy composed of a combination of polymers with a small difference in refractive index is difficult to measure because of its small signal intensity. In such a case, an optional treatment with a staining reagent such as iodine, $RuO_4$, or $OsO_4$ is also effective.

The polymer alloy used in the method of producing the polymer alloy may further contain various additives as long as the alloy is not compromised. The polymer alloy may further contain various additives as long as the alloy is not compromised.

Examples of such additives include reinforcing materials and non-plate-shaped fillers such as talc, kaolin, mica, clay, bentonite, sericite, basic magnesium carbonate, glass flakes, glass fibers, carbon fibers, asbestos fibers, rock wool, silicic sand, wallastonite, and glass beads, antioxidants (such as a phosphorus type and a sulfur type), ultraviolet absorbents, heat stabilizers (such as a hindered phenol type), transesterification inhibitors, inorganic crystal-nucleating agents (such as talc), organic crystal-nucleating agents (such as sorbitol derivatives and aliphatic carboxylic acid amides), lubricants, releasing agents, antistatic agents, anti-blocking agents, coloring agents including dyes and pigments, flame retardants (such as a halogen type and a phosphorus type), flame retardation aids (such as an antimony compound typified by antimony trioxide, zirconium oxide, and molybdenum oxide), foaming agents, coupling agents (such as silane or titanium coupling agents containing at least one of an epoxy group, an amino group, a mercapto group, a vinyl group, and an isocyanate group), anti-bacterial agents, and the like.

The polymer alloy may be molded into a molded product. Preferred molding methods include injection molding, film forming, sheet forming, inflation molding, and blow molding, and injection molding, film forming, and sheet forming are particularly preferred. For example, the molded product comprising the polymer alloy is an injection-molded product, a film, a sheet, or the like. The molded product comprising the polymer alloy is also preferably a molded product obtained by subjecting a film(s) or a sheet(s) to post-processing such as lamination, corrugation, or surface coating.

The molded product has very good impact resistance and, therefore, is suitable for use in various applications such as automobile parts, electrical and electronic parts, and packaging materials.

EXAMPLES

Hereinafter, our polymer alloys, methods and molded products are described with reference to Examples. In the Examples and the Comparative Examples, the measurement methods described below were performed.

Transmission Electron Micrograph

An ultra-thin section sample obtained by cutting with an ultramicrotome was observed for phase structure using a transmission electron microscope H-7100 manufactured by Hitachi, Ltd. at a magnification of 120,000 times.

Correlation Length Determined from Small-Angle X-Ray Scattering Spectrum

Using no cover glass, a sample sandwiched between kapton films was thermally pressed to form a 0.1 mm thick sample sheet. The resulting thin-film sample was separated from the kapton films and directly subjected to the measurement. Small-angle X-ray scattering was performed using RA-micro 7 manufactured by Rigaku Corporation, in which an imaging plate was exposed for 30 minutes. The resulting two-dimensional data was converted into a one-dimensional scattering profile by circular averaging. A Debye plot of reciprocal of scattering intensity against wavenumber was made based on the resulting scattering profile. In the Debye plot, the correlation length was determined from the square root of the quotient obtained by dividing the slope of the Debye plot by the intercept.

Correlation Length Determined from Light Scattering Spectrum

A polymer alloy was sandwiched between 0.1 mm thick cover glasses and thermally pressed to form a thin film sample, which was subjected to light scattering measurement while sandwiched between the cover glasses. Light scattering was performed using DYNA-300 manufactured by OTSUKA ELECTRONICS CO., LTD., in which a CCD camera was exposed for 1 minute. The resulting two-dimensional data was converted into a one-dimensional scattering profile by circular averaging. A Debye plot of reciprocal of scattering intensity against wavenumber was made based on the resulting scattering profile. In the Debye plot, the correlation length was determined from the square root of the quotient obtained by dividing the slope of the Debye plot by the intercept.

Compactness (C) and Phase Structure Form

Figure 4:
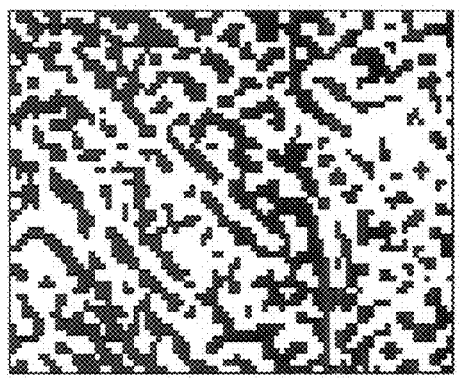
FIG. 4 is a schematic diagram of phase structure forms.
Figure 4:
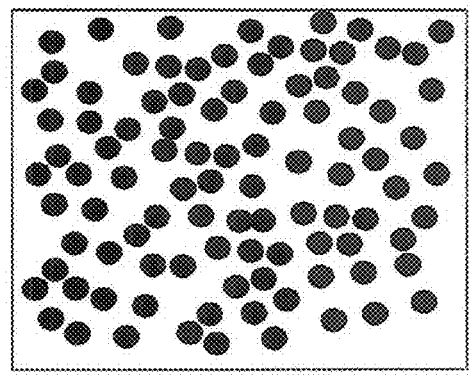
Figure 4:
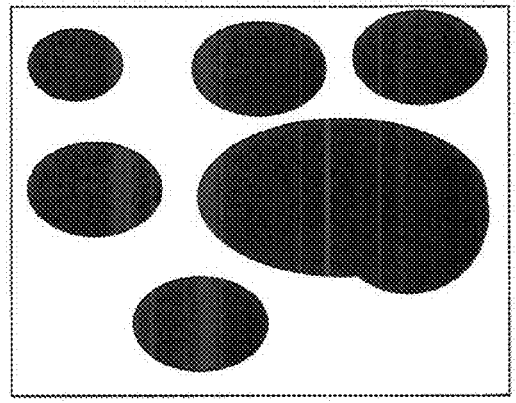

Randomly, 100 parts of the dispersed phase were selected, and the compactness (C) of each part was calculated from the area (S) and the circumference length (L) of the dispersed phase using image analysis software Scion Image. Each calculated average compactness (C) is shown in the Tables. FIG. 4 shows schematic diagrams of phase structure forms. The Tables show that the phase structure form observed in each of the Examples and the Comparative Examples corresponded to (a), (b), or (c) in FIG. 4. For example, it is shown that the phase structure (a) in FIG. 4 was observed in Example 1.

Heatproof Temperature

Examples 1 to 7 and Comparative Examples 1 to 3

It is shown in Examples 1 to 7 and Comparative Examples 1 to 3.

Heat Resistance (DTUL) Test

Examples 8 to 20 and Comparative Examples 4 to 16

According to ASTM D 648, the deflection temperature under load was measured at a rate of temperature increase of 120° C./hr under a load of 1.82 MPa using 148-HDD-6S manufactured by YASUDA SEIKI SEISAKUSHO, LTD.

Tensile Strength and Tensile Elongation

Examples 1 to 7 and Comparative Examples 1 to 3

A sample, which was obtained by a process including performing kneading with a Banbury mixer and then performing rapid cooling in ice water to fix the structure, was thermally pressed under 1.5 MPa for 10 seconds to form a sheet (0.8 mm in thickness). A 50 mm long, 10 mm wide, 0.8 mm thick sample was cut from the sheet and subjected to measurement with an inter-chuck distance of 20 mm at a tension rate of 10 mm/minute using UTA-2.5T manufactured by ORIENTEC Co., LTD.

Tensile Strength and Tensile Elongation

Examples 8 to 20 and Comparative Examples 4 to 16

According to ASTM D 638, the No. 1 dumbbell sample was subjected to measurement with a sample-reference point distance of 114 mm at a tension rate of 10 mm/minute using UTA-2.5T manufactured by ORIENTEC Co., LTD.

Total Light Transmittance (1)

Examples 1 to 7 and Comparative Examples 1 to 3

A sample, which was obtained by a process including performing kneading with a Banbury mixer and then performing rapid cooling in ice water to fix the structure, was thermally pressed under 1.5 MPa for 10 seconds to form a sheet (0.8 mm in thickness). A 50 mm long, 10 mm wide, 0.8 mm thick sample was cut from the sheet and measured for total light transmittance at wavelengths of 240 to 260 nm using a spectrophotometer MPC-3100 manufactured by SHIMADZU CORPORATION.

Light Transmittance (2)

Examples 8 to 20 and Comparative Examples 4 to 16

The light transmittance was measured at a wavelength of 400 nm using an 80 mm square, 1 mm thick square plate (film gate) and a spectrophotometer MPC-3100 manufactured by SHIMADZU CORPORATION.

As shown in Tables 1 to 6, the following resins were used.
PC(1): Polycarbonate resin (Yupilon H-4000 manufactured by Mitsubishi Engineering-Plastics Corporation, 155° C. in glass transition temperature)
PC(2): Polycarbonate resin (TARFLON A-1900 manufactured by Idemitsu Kosan Co., Ltd., 155° C. in glass transition temperature)
PMMA: Poly(methyl methacrylate) (SUMIPEX MHF manufactured by Sumitomo Chemical Co., Ltd., 105° C. in glass transition temperature)
PPO: Polyphenylene oxide (PX-100F manufactured by Mitsubishi Engineering-Plastics Corporation, 205° C. in glass transition temperature)
N66: Polyamide 66 resin (polyamide 66 resin with a melting point of 265° C., a terminal amino group concentration of $11.5 \times 10^{-5}$ mol/g, a relative viscosity of 2.65 in 98% sulfuric acid 1 g/dl, and a glass transition temperature of 49° C.)
HPPO: (Modified PPO resin obtained by dry-blending 100 parts by weight of Yupiace PX-100F manufactured by Mitsubishi Engineering-Plastics Corporation, 1.2 parts by weight of maleic anhydride, and 0.1 part by weight of a radial generator (PERHEXYNE 25B manufactured by NOF CORPORATION) and compounding the blend at a cylinder temperature of 320° C., 205° C. in glass transition temperature)
SMA: Maleic anhydride-modified polystyrene resin (DYLARK D332 manufactured by NOVA Chemicals Japan Ltd., 15% by weight in maleic anhydride content, 131° C. in glass transition temperature)
Modified vinyl copolymer: Styrene/acrylonitrile/glycidyl methacrylate copolymer (The modified vinyl copolymer was prepared by suspension polymerization of a monomer mixture of 69.7% styrene, 30% acrylonitrile, and 0.3% glycidyl methacrylate. The resulting modified vinyl copolymer had a limiting viscosity of methyl ethyl ketone soluble matter of 0.53 dl/g, a styrene monomer unit content of 69.7% by weight, an acrylonitrile monomer unit content of 30% by weight, and a glycidyl methacrylate monomer unit content of 0.3% by weight. It has a glass transition temperature of 100° C.)
PLA: Polylactic acid resin (poly(L-lactic acid) resin with a D-form content of 4.0%, a PMMA-equivalent weight average molecular weight of 220,000, and a glass transition temperature of 60° C.)

Chaotic Mixing Zone

In Examples 8 to 20 and Comparative Examples 4, 6, 8, 11, 14, and 16, the chaotic mixing zone comprises alternately arranged twist kneading disks and back-mixing screws, in which each twist kneading disk has a spiral angle $\theta$ of more than 0° to less than 90° ($0°<\theta<90°$) in the half-rotation direction of the screw, wherein the spiral angle $\theta$ is the angle between the apex on the front end side of the kneading disk and the apex on the rear face side, and each back-mixing screw comprises a flight screw having a resin passageway formed in the flight part from the front end to the rear end of the screw.

Examples 1 to 7 and Comparative Examples 1 to 3

Raw materials were fed to a Banbury mixer and kneaded for 2 minutes at the barrel set temperature (compounding temperature) shown in Table 1, and then the mixture was taken out and cooled rapidly in ice water so that the structure was fixed. The barrel set temperature shown in Table 1 corresponds to the compounding temperature. The Banbury mixer was a mixer having left and right Banbury-type screws installed in Laboplast Mill Model 50C150 (manufactured by Toyo Seiki Seisakusho Co., Ltd.), and the number of screw revolutions was set at 10 rpm. The component materials are shown in Table 1.

During the compounding in the Banbury mixer, the manner in which the resin composition was mixed was observed from the window at the top of the mixer. As a result, in Examples 1 to 7, a chaotic mixing state was produced in which the alloy components were repeatedly stretched and folded. It was found that in Comparative Examples 1 to 3 where the barrel set temperature was high, the alloy components were insufficiently stretched and ruptured so that no chaotic mixing state was produced.

Figure 2:
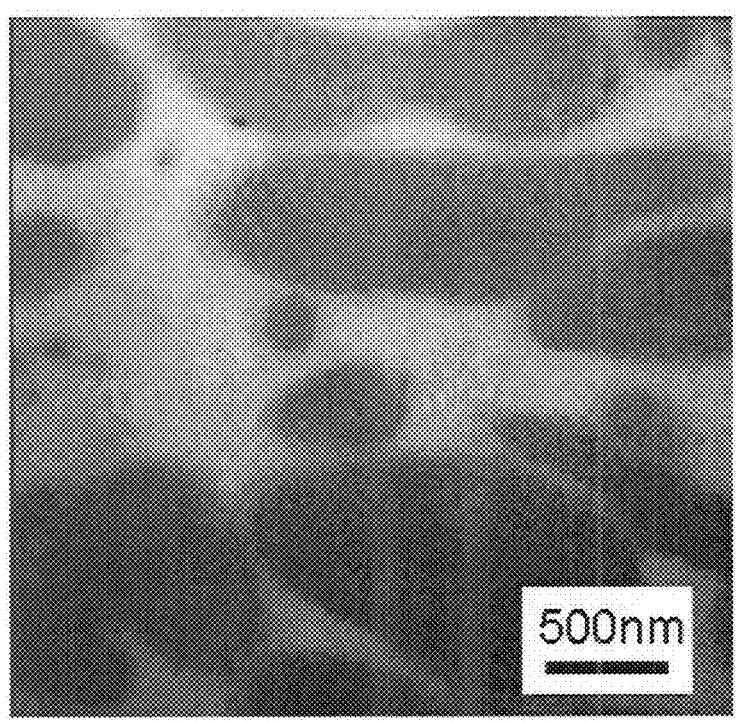
FIG. 2 is a transmission electron micrograph of Comparative Example 1.

After compounding, the sample was taken out and cooled rapidly in ice water, and an ultra-thin section was cut from the sample. The state of the structure of the sample section was observed using a transmission electron microscope at a magnification of 120,000 times. As a result, it was found that all samples had a non-periodic structure. FIG. 1 shows the transmission electron micrograph of Example 2, and FIG. 2 shows the transmission electron micrograph of Comparative Example 1. Table 1 shows the compactness (C) and the phase structure form.

In Example 1, after compounding, the sample was taken out and cooled rapidly in ice water and then subjected to heat pressing under 1.5 MPa at 190° C. for 10 seconds to form a sheet (0.1 mm in thickness) which was measured for small-angle X-ray scattering spectrum. In each of Examples 2 to 7 and Comparative Examples 1 to 3, after kneading, the sample was taken out and cooled rapidly in ice water and then subjected to heat pressing under 1.5 MPa for 10 seconds at the barrel set temperature shown in Table 1 to form a sheet (0.1 mm in thickness), which was measured for light scattering spectrum. The correlation length was determined from the scattering profile obtained as described above, which is shown in Table 1.

Besides the above, after the compounding in the Banbury mixer, the sample was cooled rapidly in ice water to have a fixed structure and then subjected to heat pressing under 1.5 MPa for 10 seconds to form a sheet (0.8 mm in thickness). From the sheet, 85 mm long, 20 mm wide, 0.8 mm thick strip samples were obtained by cutting. While the strip sample was horizontally fixed by holding one end portion (20 mm) of the sample, the sample was allowed to stand for 60 minutes in an oven at 90, 100, 110, 120, 130, 140, 150, 160, 170, 180, 190, or 200° C. Thereafter, the vertical distance, by which the opposite end from the held end dropped, was measured. Subsequently, each vertical dropping distance was plotted against each temperature and adjacent points were connected with straight lines. The heatproof temperature was defined as the temperature at which the vertical dropping distance reached 3 mm. The resulting value is shown in Table 1.

Table 1 also shows the results of the measurement of the tensile strength, the tensile elongation, and the total light transmittance with respect to the samples each having the structure fixed by rapid cooling in ice water after the compounding in the Banbury mixer.

TABLE 1

| | | | EXAMPLE 1 | EXAMPLE 2 | EXAMPLE 3 | EXAMPLE 4 | EXAMPLE 5 | EXAMPLE 6 |
|---|---|---|---|---|---|---|---|---|
| Components | PC(1) | Parts by weight | 50 | 50 | 50 | 30 | 70 | 50 |
| | PMMA | Parts by weight | 50 | 50 | 50 | 70 | 30 | |
| | PPO | Parts by weight | | | | | | 50 |
| Process | Compounding apparatus | | Banbury mixer | | | | | |
| | Barrel set temperature | ° C. | 190 | 210 | 220 | 210 | 210 | 250 |
| | Difference between kneading temperature and the highest glass transition temperature of resin among those used | ° C. | 35 | 55 | 65 | 55 | 55 | 45 |
| | Chaotic mixing | | Present | Present | Present | Present | Present | Present |
| Phase structure | Structure | | Non-periodic structure | Non-periodic structure | Non-periodic structure | Non-periodic structure | Non-periodic structure | Non-periodic structure |
| | Correlation length | μm | 0.01 | 0.1 | 0.2 | 0.1 | 0.1 | 0.1 |
| | Compactness (C) | | 0.24 | 0.45 | 0.66 | 0.46 | 0.41 | 0.38 |
| | Form | | a | a | a | a | a | a |
| Properties | Heatproof temperature | ° C. | 135 | 143 | 140 | 133 | 152 | 197 |
| | Tensile strength | MPa | 71 | 72 | 70 | 68 | 73 | 70 |
| | Tensile elongation | % | 18 | 20 | 15 | 13 | 15 | 14 |
| | Total light transmittance (1) | % | 89 | 89 | 87 | 89 | 89 | 88 |

| | | | EXAMPLE 7 | COMPARATIVE EXAMPLE 1 | COMPARATIVE EXAMPLE 2 | COMPARATIVE EXAMPLE 3 |
|---|---|---|---|---|---|---|
| Components | PC(1) | Parts by weight | | 50 | 50 | |
| | PMMA | Parts by weight | 50 | 50 | | 50 |
| | PPO | Parts by weight | 50 | | 50 | 50 |
| Process | Compounding apparatus | | Banbury mixer | | | |
| | Barrel set temperature | ° C. | 230 | 250 | 280 | 280 |
| | Difference between kneading temperature and the highest glass transition temperature of resin among those used | ° C. | 25 | 95 | 75 | 75 |
| | Chaotic mixing | | Present | Absent | Absent | Absent |

TABLE 1-continued

| Phase structure | Structure | | Non-periodic structure | Non-periodic structure | Non-periodic structure | Non-periodic structure |
|---|---|---|---|---|---|---|
| | Correlation length | μm | 0.1 | 2.5 | 2.6 | 3.5 |
| | Compactness (C) | | 0.42 | 0.9 | 0.8 | 0.85 |
| | Form | | a | c | c | c |
| Properties | Heatproof temperature | °C. | 185 | 102 | 155 | 110 |
| | Tensile strength | MPa | 65 | 42 | 35 | 30 |
| | Tensile elongation | % | 12 | 5 | 7 | 2 |
| | Total light transmittance (1) | % | 89 | 35 | 30 | 33 |

The results in Table 1 show that when immiscible-type polymer alloys with a non-periodic structure are produced by compounding under chaotic mixing conditions, the correlation length and the compactness (C) can be significantly reduced, and polymer alloys with fine and sophisticated structures can be obtained. These polymer alloys have significantly improved heat resistance, good mechanical properties including good tensile strength and good tensile elongation, and high transparency, as compared with polymer alloys obtained by conventional compounding methods without chaotic mixing.

Example 8 and Comparative Examples 4 and 5

The component materials shown in Table 2 were fed to a twin-screw extruder (TEX30X SSST manufactured by The Japan Steel Works, Ltd. (L/D=45.5 (wherein (L) is the length from the raw material supply port to the discharge port)) at a number of screw revolutions of 200 rpm, and the barrel temperature downstream of the polymer melting part was controlled to the temperature shown in Table 2. After discharge from the die, the gut was cooled rapidly in ice water so that the structure was fixed. Thereafter, the gut was pelletized into pellets by a strand cutter.

In Example 8 and Comparative Example 4, the screw arrangement (type A) used was such that zones where compounding were performed under chaotic mixing (chaotic mixing zones) were arranged over the whole area such that the ratio of the total length of the chaotic mixing zones to the whole length of the screw was 50% in the extruder. In Comparative Example 5, the screw arrangement (type B) used was such that general kneading disks (L/D=3.8) were placed from the position of L/D=22, 28.

Using CAE analysis software SCREWFLOW-MULTI installed in the extruder manufactured by The Japan Steel Works, Ltd., the initial positions of 1,000 particles were randomly determined at the time t=0 in a cross-section upstream of the screw, and the movement associated with the velocity field calculated by analysis on the screw to be evaluated was tracked by simulation, so that the logarithm of the hypothetical elongation: $(\ln L/L_0)$, wherein (L) and $(L_0)$ represent the length of a line and the initial length of the line, respectively, was calculated. As a result, $(\ln L/L_0)$ for the type A was 4.2, and $(\ln L/L_0)$ for the type B was 1.5.

An ultra-thin section sample was obtained by cutting from the pellet, and the structural state of the sample was observed using a transmission electron microscope. As a result, it was found that all samples had a non-periodic structure.

In addition, the sample was thermally pressed under 1.5 MPa for 10 seconds at the barrel set temperature shown in Table 2 to form a sheet (0.1 mm in thickness) which was measured for light scattering spectrum. The correlation length was determined from the resulting scattering profile, which is shown in Table 2.

The pellet was molded into a ⅛ inch thick ASTM No. 1 dumbbell test piece and a bending test piece according to ASTM D 790 using a molding cycle of pressure holding for 10 seconds and cooling for 15 seconds at a die temperature of 80° C. in an injection molding machine (SG-75H-MIV) manufactured by Sumitomo Heavy Industries, Ltd. with the temperature set at 280° C.-285° C.-290° C.-290° C. from the bottom to the top of the hopper. Similarly to the pellet, an ultra-thin section sample was obtained by cutting from the resulting molded product, and the structural state of the sample was observed using a transmission electron microscope. As a result, it was found that all samples had a non-periodic structure.

In addition, the sample was thermally pressed under 1.5 MPa for 10 seconds at the barrel set temperature shown in Table 2 to form a sheet (0.1 mm in thickness), which was measured for light scattering spectrum. A Debye plot of reciprocal of scattering intensity against wavenumber was made based on the resulting scattering profile. In the Debye plot, the correlation length was determined from the square root of the quotient obtained by dividing the slope of the Debye plot by the intercept. The result is shown in Table 2.

The results of the evaluation of the molded products are shown in Table 2.

TABLE 2

| | | | EXAMPLE 8 | COMPARATIVE EXAMPLE 4 | COMPARATIVE EXAMPLE 5 |
|---|---|---|---|---|---|
| Components | PC(1) | Parts by weight | 50 | 50 | 50 |
| | PMMA | Parts by weight | 50 | 50 | 50 |
| Process | Compounding apparatus | | | Twin-screw extruder | |
| | Screw arrangement | | Type A | Type A | Type B |
| | Barrel set temperature | °C. | 210 | 250 | 210 |

TABLE 2-continued

|  |  |  | EXAMPLE 8 | COMPARATIVE EXAMPLE 4 | COMPARATIVE EXAMPLE 5 |
|---|---|---|---|---|---|
|  | Difference between kneading temperature and the highest glass transition temperature of resin among those used | °C. | 55 | 95 | 55 |
|  | Chaotic mixing |  | Present | Absent | Absent |
| Phase structure (pellet) | Structure |  | Non-periodic structure | Non-periodic structure | Non-periodic structure |
|  | Correlation length | μm | 0.1 | 2.2 | 2.2 |
|  | Compactness (C) |  | 0.43 | 0.9 | 0.9 |
|  | Form |  | a | c | c |
| Phase structure (injection molding) | Structure |  | Non-periodic structure | Non-periodic structure | Non-periodic structure |
|  | Correlation length | μm | 0.1 | 2.5 | 2.5 |
|  | Compactness (C) |  | 0.45 | 0.9 | 0.9 |
|  | Form |  | a | c | c |
| Properties | Heat resistance (DTUL) | °C. | 145 | 100 | 103 |
|  | Tensile strength | MPa | 75 | 43 | 41 |
|  | Tensile elongation | % | 25 | 4 | 3 |

The results in Table 2 show that when immiscible-type polymer alloys with a non-periodic structure are produced by compounding under chaotic mixing conditions, the correlation length and the compactness (C) can be significantly reduced, and polymer alloys with fine and sophisticated structures can be obtained. These polymer alloys have significantly improved heat resistance and good mechanical properties including good tensile strength and good tensile elongation, as compared with polymer alloys obtained by conventional compounding methods without chaotic mixing.

Example 9 and Comparative Examples 6 and 7

The component materials shown in Table 3 were fed to a twin-screw extruder (TEX30X SSST manufactured by The Japan Steel Works, Ltd. (L/D=45.5 (wherein (L) is the length from the raw material supply port to the discharge port)) at a number of screw revolutions of 100 rpm, and the barrel temperature downstream of the polymer melting part was controlled to the temperature shown in Table 3. After discharge from the die, the gut was cooled rapidly in ice water so that the structure was fixed. Thereafter, the gut was pelletized into pellets by a strand cutter.

In Example 9 and Comparative Example 6, the screw arrangement (type A) used was such that zones where compounding were performed under chaotic mixing (chaotic mixing zones) were arranged over the whole area such that the ratio of the total length of the chaotic mixing zones to the whole length of the screw was 50% in the extruder. In Comparative Example 7, the screw arrangement (type B) used was such that general kneading disks (L/D=3.8) were placed from the position of L/D=22, 28.

Using CAE analysis software SCREWFLOW-MULTI installed in the extruder manufactured by The Japan Steel Works, Ltd., the initial positions of 1,000 particles were randomly determined at the time t=0 in a cross-section upstream of the screw and the movement associated with the velocity field calculated by analysis on the screw to be evaluated was tracked by simulation so that the logarithm of the hypothetical elongation: (ln $L/L_0$), wherein (L) and ($L_0$) represent the length of a line and the initial length of the line, respectively, was calculated. As a result, (ln $L/L_0$) for the type A was 4.2, and (ln $L/L_0$) for the type B was 1.5.

An ultra-thin section sample was obtained by cutting from the pellet, and the structural state of the sample was observed using a transmission electron microscope at a magnification of 120,000 times. As a result, it was confirmed that all samples had a non-periodic structure. Randomly, 100 parts of the dispersed phase were selected and the compactness (C) of each part was calculated from the area (S) and the circumference length (L) of the dispersed phase using image analysis software Scion Image. Each calculated average compactness (C) is shown in Table 3. Concerning the phase structure form, the schematic form shown in FIG. 4 is also indicated in Table 3.

In addition, the samples of Example 9 and Comparative Example 7 were each thermally pressed under 1.5 MPa at 265° C. for 10 seconds to form a sheet (0.1 mm in thickness), which was measured for light scattering spectrum. The sample of Comparative Example 6 was thermally pressed under 1.5 MPa for 10 seconds at the barrel set temperature shown in Table 3 to form a sheet (0.1 mm in thickness), which was measured for light scattering spectrum. A Debye plot of reciprocal of scattering intensity against wavenumber was made based on the resulting scattering profile. In the Debye plot, the correlation length was determined from the square root of the quotient obtained by dividing the slope of the Debye plot by the intercept. The result is shown in Table 3.

The pellet was molded into a ⅛ inch thick ASTM No. 1 dumbbell test piece and a bending test piece according to ASTM D 790 using a molding cycle of pressure holding for 10 seconds and cooling for 15 seconds at a die temperature of 80° C. in an injection molding machine (SG-75H-MIV) manufactured by Sumitomo Heavy Industries, Ltd. with the temperature set at 280° C.-285° C.-290° C.-290° C. from the bottom to the top of the hopper. Similarly to the pellet, an ultra-thin section sample was obtained by cutting from the resulting molded product and the structural state of the sample was observed using a transmission electron microscope. As a result, it was found that all samples had a non-periodic structure. Randomly, 100 parts of the dispersed phase were selected and the compactness (C) of each part was calculated from the area (S) and the circumference length (L) of the dispersed phase using image analysis software Scion Image. Each calculated average compactness (C) is shown in Table 3. Concerning the phase structure form, the schematic form shown in FIG. 4 is also indicated in Table 3.

The results of the evaluation of the molded products are shown in Table 3.

TABLE 3

| | | | EXAMPLE 9 | COMPARATIVE EXAMPLE 6 | COMPARATIVE EXAMPLE 7 |
|---|---|---|---|---|---|
| Components | N66 | Parts by weight | 50 | 50 | 50 |
| | HPPO | Parts by weight | 50 | 50 | 50 |
| | SMA | Parts by weight | 3 | 3 | 3 |
| Process | Compounding apparatus | | | Twin-screw extruder | |
| | Screw arrangement | | Type A | Type A | Type B |
| | Barrel set temperature | °C. | 210 | 290 | 210 |
| | Difference between kneading temperature and the highest glass transition temperature of resin among those used | °C. | 5 | 85 | 5 |
| | Chaotic mixing | | Present | Absent | Absent |
| Phase structure (pellet) | Structure | | Non-periodic structure | Non-periodic structure | Non-periodic structure |
| | Correlation length | μm | 0.1 | 0.9 | 0.8 |
| | Compactness (C) | | 0.33 | 0.9 | 0.9 |
| | Form | | a | c | c |
| Phase structure (injection molding) | Structure | | Non-periodic structure | Non-periodic structure | Non-periodic structure |
| | Correlation length | μm | 0.1 | 1.2 | 1.2 |
| | Compactness (C) | | 0.36 | 0.9 | 0.9 |
| | Form | | a | c | c |
| Properties | Heat resistance (DTUL) | °C. | 151 | 132 | 133 |
| | Tensile strength | MPa | 77 | 74 | 73 |
| | Tensile elongation | % | 68 | 25 | 27 |

The results in Table 3 show that when immiscible-type polymer alloys with a non-periodic structure are produced by compounding under chaotic mixing conditions, the correlation length and the compactness (C) were significantly reduced and polymer alloys with fine and sophisticated structures were obtained. These polymer alloys have significantly improved heat resistance and good mechanical properties including good tensile elongation, as compared with polymer alloys obtained by conventional compounding methods without chaotic mixing.

Examples 10 to 14 and Comparative Examples 8 to 10

The component materials shown in Table 4 were fed to a twin-screw extruder (TEX30X SSST manufactured by The Japan Steel Works, Ltd. (L/D=45.5 (wherein (L) is the length from the raw material supply port to the discharge port)) at a number of screw revolutions of 100 rpm and the barrel set temperature in the area from the polymer melting part to the bent was controlled to the temperature shown in Table 4. After discharge from the die, the gut was cooled rapidly in ice water so that the structure was fixed. Thereafter, the gut was pelletized into pellets by a strand cutter.

In Examples 10 to 14 and Comparative Example 8, the screw arrangement (type A) used was such that zones where compounding were performed under chaotic mixing (chaotic mixing zones) were arranged over the whole area such that the ratio of the total length of the chaotic mixing zones to the whole length of the screw was 50% in the extruder. In Comparative Examples 9 and 10, the screw arrangement (type B) used was such that general kneading disks (L/D=3.8) were placed from the position of L/D=22, 28.

Using CAE analysis software SCREWFLOW-MULTI installed in the extruder manufactured by The Japan Steel Works, Ltd., the initial positions of 1,000 particles were randomly determined at the time t=0 in a cross-section upstream of the screw and movement associated with the velocity field calculated by analysis on the screw to be evaluated was tracked by simulation so that the logarithm of the hypothetical elongation: (ln $L/L_0$) wherein (L) and ($L_0$) represent the length of a line and the initial length of the line, respectively, was calculated. As a result, (ln $L/L_0$) for the type A was 4.2, and (ln $L/L_0$) for the type B was 1.5.

Figure 3:
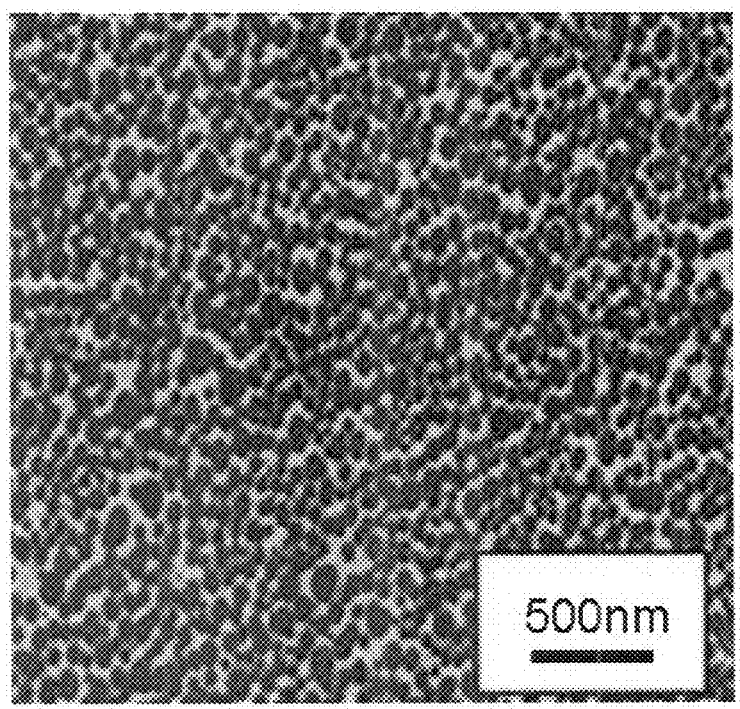
FIG. 3 is a transmission electron micrograph of Example 12.

An ultra-thin section sample was obtained by cutting from the pellet and the structural state of the sample was observed using a transmission electron microscope at a magnification of 120,000 times. As a result, it was confirmed that all samples had a dispersion structure. FIG. 3 shows the transmission electron micrograph of Example 12. Concerning the phase structure form, the schematic form shown in FIG. 4 is also indicated in Table 4.

In the electron micrograph, 100 particles dispersed in the polymer alloy were randomly selected and the major axis of each particle was measured. The average particle size was determined by calculating the number average value. The result is shown in Table 4.

In addition, the sample was thermally pressed under 1.5 MPa for 10 seconds at the barrel set temperature shown in Table 4 to form a sheet (0.1 mm in thickness), which was measured for light scattering spectrum. The peak half width (a) and the maximum wavenumber (b) of the peak in the resulting spectrum, and the value (a)/(b) are shown in Table 4.

The pellet was molded into a ⅛ inch thick ASTM No. 1 dumbbell test piece, a bending test piece according to ASTM D 790, and an 80 mm square, 1 mm thick square plate (film gate), using a molding cycle of pressure holding for 10 seconds and cooling for 15 seconds at a die temperature of 80° C. in an injection molding machine (SG-75H-MIV) manufactured by Sumitomo Heavy Industries, Ltd. with the temperature set at 240° C.-245° C.-250° C.-250° C. from the bottom to the top of the hopper. The resulting molded products were evaluated as shown below. The results are shown in Table 4.

TABLE 4

| | | | EXAMPLE 10 | EXAMPLE 11 | EXAMPLE 12 | EXAMPLE 13 | EXAMPLE 14 |
|---|---|---|---|---|---|---|---|
| Components | PC(1) | Parts by weight | 70 | 50 | 50 | 50 | 30 |
| | Modified vinyl copolymer | Parts by weight | 30 | 50 | 50 | 50 | 70 |
| Process | Compounding apparatus | | Twin-screw extruder | | | | |
| | Screw arrangement | | Type A | Type A | Type A | Type A | Type A |
| | Barrel set temperature | °C. | 175 | 160 | 170 | 180 | 160 |
| | Difference between kneading temperature and the highest glass transition temperature of resin among those used | °C. | 20 | 5 | 15 | 25 | 5 |
| | Chaotic mixing | | Present | Present | Present | Present | Present |
| Phase structure (pellet) | Structure | | Dispersion structure | Dispersion structure | Dispersion structure | Dispersion structure | Dispersion structure |
| | Glass transition temperature | | Plural | Plural | Plural | Plural | Plural |
| | Average particle size | μm | 0.08 | 0.11 | 0.22 | 0.36 | 0.30 |
| | Peak half width (a) | nm$^{-1}$ | 0.01352 | 0.01053 | 0.00560 | 0.00374 | 0.00405 |
| | Peak maximum wavenumber (b) | nm$^{-1}$ | 0.01250 | 0.00910 | 0.00455 | 0.00280 | 0.00335 |
| | (a)/(b) | | 1.08 | 1.16 | 1.23 | 1.34 | 1.21 |
| | Form | | b | b | b | b | b |
| Properties | Heat resistance (DTUL) | °C. | 135 | 128 | 126 | 120 | 118 |
| | Tensile strength | MPa | 70 | 72 | 70 | 70 | 74 |
| | Tensile elongation | % | 110 | 95 | 89 | 75 | 73 |
| | Total light transmittance (2) | % | 89 | 87 | 85 | 84 | 89 |

| | | | COMPARATIVE EXAMPLE 8 | COMPARATIVE EXAMPLE 9 | COMPARATIVE EXAMPLE 10 |
|---|---|---|---|---|---|
| Components | PC(1) | Parts by weight | 50 | 50 | 50 |
| | Modified vinyl copolymer | Parts by weight | 50 | 50 | 50 |
| Process | Compounding apparatus | | Twin-screw extruder | | |
| | Screw arrangement | | Type A | Type B | Type B |
| | Barrel set temperature | °C. | 250 | 180 | 250 |
| | Difference between kneading temperature and the highest glass transition temperature of resin among those used | °C. | 95 | 25 | 95 |
| | Chaotic mixing | | Absent | Absent | Absent |
| Phase structure (pellet) | Structure | | Dispersion structure | Dispersion structure | Dispersion structure |
| | Glass transition temperature | | Plural | Plural | Plural |
| | Average particle size | μm | 1.25 | 0.91 | 1.43 |
| | Peak half width (a) | nm$^{-1}$ | 0.00115 | 0.00198 | No peak |
| | Peak maximum wavenumber (b) | nm$^{-1}$ | 0.00080 | 0.00110 | |
| | (a)/(b) | | 1.44 | 1.80 | |
| | Form | | c | c | c |
| Properties | Heat resistance (DTUL) | °C. | 104 | 102 | 101 |
| | Tensile strength | MPa | 64 | 63 | 62 |

| | | | | |
|---|---|---|---|---|
| Tensile elongation | % | 15 | 11 | 7 |
| Total light transmittance (2) | % | 73 | 75 | 70 |

Even when polymer alloys were obtained by compounding a combination of immiscible thermoplastic resins, compounding under chaotic mixing conditions made it possible to make the average particle size very small and to reduce the (a)/(b) value, which was calculated from the peak half width (a) and the maximum wavenumber (b) of the peak to 1.5 or less so that polymer alloys having high uniformity of particles dispersed therein were successfully obtained.

The results in Table 4 show that polymer alloys having a very small average particle size and high uniformity of particles dispersed therein were successfully obtained. These polymer alloys had significantly improved heat resistance as compared with polymer alloys obtained by conventional compounding methods without chaotic mixing. These polymer alloys have good mechanical properties including good tensile strength and good tensile elongation and also have good transparency.

Examples 15 to 18 and Comparative Examples 11 and 12

The component materials shown in Table 5 were fed to a twin-screw extruder (TEX30X SSST manufactured by The Japan Steel Works, Ltd. (L/D=45.5 (wherein (L) is the length from the raw material supply port to the discharge port)) at a number of screw revolutions of 200 rpm, and the barrel set temperature in the area from the polymer melting part to the bent was controlled to the temperature shown in Table 5. After discharge from the die, the gut was cooled rapidly in ice water so that the structure was fixed. Thereafter, the gut was pelletized into pellets by a strand cutter.

In Examples 15 to 18 and Comparative Example 11, the screw arrangement (type A) used was such that zones where compounding were performed under chaotic mixing (chaotic mixing zones) were arranged over the whole area such that the ratio of the total length of the chaotic mixing zones to the whole length of the screw was 50% in the extruder. In Comparative Example 12, the screw arrangement (type B) used was such that general kneading disks (L/D=3.8) were placed from the position of L/D=22, 28.

Using CAE analysis software SCREWFLOW-MULTI installed in the extruder manufactured by The Japan Steel Works, Ltd., the initial positions of 1,000 particles were randomly determined at the time t=0 in a cross-section upstream of the screw and movement associated with the velocity field calculated by analysis on the screw to be evaluated was tracked by simulation, so that the logarithm of the hypothetical elongation: (ln L/$L_0$), wherein (L) and ($L_0$) represent the length of a line and the initial length of the line, respectively, was calculated. As a result, (ln L/$L_0$) for the type A was 4.2, and (ln L/$L_0$) for the type B was 1.5.

An ultra-thin section sample was obtained by cutting from the pellet, and the structural state of the sample was observed using a transmission electron microscope. As a result, it was confirmed that all samples had a dispersion structure. Concerning the phase structure form, the schematic form shown in FIG. 4 is also indicated in Table 5.

In the electron micrograph, 100 particles dispersed in the polymer alloy were randomly selected, and the major axis of each particle was measured. The average particle size was determined by calculating the number average value. The result is shown in Table 5.

In addition, the sample was thermally pressed under 1.5 MPa for 10 seconds at the barrel set temperature shown in Table 5 to form a sheet (0.1 mm in thickness), which was measured for light scattering spectrum. The peak half width (a) and the maximum wavenumber (b) of the peak in the resulting spectrum, and the value (a)/(b) are shown in Table 5.

The pellet was molded into a ⅛ inch thick ASTM No. 1 dumbbell test piece and a bending test piece according to ASTM D 790, using a molding cycle of pressure holding for 10 seconds and cooling for 15 seconds at a die temperature of 80° C. in an injection molding machine (SG-75H-MIV) manufactured by Sumitomo Heavy Industries, Ltd. with the temperature set at 240° C.-245° C.-250° C.-250° C. from the bottom to the top of the hopper. The resulting molded products were evaluated as shown below. The results are shown in Table 5.

TABLE 5

| | | | EXAMPLE 15 | EXAMPLE 16 | EXAMPLE 17 | EXAMPLE 18 | COMPARATIVE EXAMPLE 11 | COMPARATIVE EXAMPLE 12 |
|---|---|---|---|---|---|---|---|---|
| Components | PC(2) | Parts by weight | 90 | 70 | 50 | 30 | 10 | 50 |
| | PLA | Parts by weight | 10 | 30 | 50 | 70 | 90 | 50 |
| Process | Compounding apparatus | | Twin-screw extruder | | | | | |
| | Screw arrangement | | Type A | Type A | Type A | Type A | Type A | Type B |
| | Barrel set temperature | ° C. | 190 | 180 | 160 | 175 | 180 | 250 |
| | Difference between kneading temperature and the highest glass transition | ° C. | 35 | 25 | 5 | 20 | 25 | 95 |

TABLE 5-continued

| | | | EXAMPLE 15 | EXAMPLE 16 | EXAMPLE 17 | EXAMPLE 18 | COMPARATIVE EXAMPLE 11 | COMPARATIVE EXAMPLE 12 |
|---|---|---|---|---|---|---|---|---|
| Phase structure (pellet) | temperature of resin among those used Chaotic mixing Structure | | Present | Present | Present | Present | Absent | Absent |
| | | | Dispersion structure | Dispersion structure | Dispersion structure | Dispersion structure | Dispersion structure | Dispersion structure |
| | Glass transition temperature | | Plural | Plural | Plural | Plural | Plural | Plural |
| | Average particle size | μm | 0.13 | 0.17 | 0.20 | 0.36 | 0.80 | 1.67 |
| | Peak half width (a) | $nm^{-1}$ | 0.00863 | 0.00677 | 0.00612 | 0.00381 | No peak | No peak |
| | Peak maximum wavenumber (b) | $nm^{-1}$ | 0.0077 | 0.00585 | 0.00510 | 0.0028 | | |
| | (a)/(b) | | 1.12 | 1.16 | 1.20 | 1.36 | | |
| | Form | | b | b | b | b | c | c |
| Properties | Heat resistance (DTUL) | °C. | 142 | 124 | 117 | 101 | 57 | 70 |
| | Tensile strength | MPa | 67 | 67 | 68 | 67 | 65 | 58 |
| | Tensile elongation | % | 113 | 109 | 100 | 90 | 3 | 12 |

Even when polymer alloys were obtained by compounding a combination of immiscible thermoplastic resins, compounding under chaotic mixing conditions made it possible to make the average particle size very small and to reduce the (a)/(b) value, which was calculated from the peak half width (a) and the maximum wavenumber (b) of the peak to 1.5 or less so that polymer alloys having high uniformity of particles dispersed therein were successfully obtained.

The results in Table 5 show that polymer alloys having a very small average particle size and high uniformity of particles dispersed therein were successfully obtained. These polymer alloys have significantly improved heat resistance and good mechanical properties including good tensile strength and good tensile elongation, as compared with polymer alloys obtained by conventional kneading methods without chaotic mixing.

Examples 19 to 20 and Comparative Examples 13 to 16

The component materials shown in Table 6 were fed to a twin-screw extruder (TEX30X SSST manufactured by The Japan Steel Works, Ltd. (L/D=45.5 (wherein L is the length from the raw material supply port to the discharge port)) at a number of screw revolutions of 100 rpm and the barrel temperature in the area from the polymer melting part to the bent was controlled to the temperature shown in Table 6. After discharge from the die, the gut was cooled rapidly in ice water so that the structure was fixed. Thereafter, the gut was pelletized into pellets by a strand cutter.

In Examples 19 and 20 and Comparative Examples 14 and 16, the screw arrangement (type A) used was such that zones where compounding were performed under chaotic mixing (chaotic mixing zones) were arranged over the whole area such that the ratio of the total length of the chaotic mixing zones to the whole length of the screw was 50% in the extruder. In Comparative Examples 13 and 15, the screw arrangement (type B) used was such that general kneading disks (L/D=3.8) were placed from the position of L/D=22, 28.

Using CAE analysis software SCREWFLOW-MULTI installed in the extruder manufactured by The Japan Steel Works, Ltd., the initial positions of 1,000 particles were randomly determined at the time t=0 in a cross-section upstream of the screw and movement associated with the velocity field calculated by analysis on the screw to be evaluated was tracked by simulation, so that the logarithm of the hypothetical elongation: (ln L/$L_0$), wherein (L) and ($L_0$) represent the length of a line and the initial length of the line, respectively, was calculated. As a result, (ln L/$L_0$) for the type A was 4.2, and (ln L/$L_0$) for the type B was 1.5.

An ultra-thin section sample was obtained by cutting from the pellet, and the structural state of the sample was observed using a transmission electron microscope. As a result, it was confirmed that all samples had a dispersion structure. Concerning the phase structure form, the schematic form shown in FIG. 4 is also indicated in Table 6.

In the electron micrograph, 100 particles dispersed in the polymer alloy were randomly selected and the major axis of each particle was measured. The average particle size was determined by calculating the number average value. The result is shown in Table 6.

In addition, the samples of Examples 19 and 20 and Comparative Examples 13 and 15 were each thermally pressed under 1.5 MPa at 265° C. for 10 seconds to form a sheet (0.1 mm in thickness), which was measured for light scattering spectrum. The samples of Comparative Examples 14 and 16 were each thermally pressed under 1.5 MPa for 10 seconds at the barrel set temperature shown in Table 6 to form a sheet (0.1 mm in thickness), which was measured for light scattering spectrum. The peak half width (a) and the maximum wavenumber (b) of the peak in the resulting spectrum, and the value (a)/(b) are shown in Table 6.

The pellet was molded into a ⅛ inch thick ASTM No. 1 dumbbell test piece and a bending test piece according to ASTM D 790 using a molding cycle of pressure holding for 10 seconds and cooling for 15 seconds at a die temperature of 80° C. in an injection molding machine (SG-75H-MIV) manufactured by Sumitomo Heavy Industries, Ltd. with the temperature set at 280° C.-285° C.-290° C.-290° C. from the bottom to the top of the hopper. The resulting molded products were evaluated as shown below. The results are shown in Table 6.

TABLE 6

| | | | EXAMPLE 19 | EXAMPLE 20 | COMPARATIVE EXAMPLE 13 | COMPARATIVE EXAMPLE 14 | COMPARATIVE EXAMPLE 15 | COMPARATIVE EXAMPLE 16 |
|---|---|---|---|---|---|---|---|---|
| Components | N66 | Parts by weight | 50 | 35 | 50 | 50 | 35 | 35 |
| | HPPO | Parts by weight | 50 | 65 | 50 | 50 | 65 | 65 |
| Process | Compounding apparatus | | | | Twin-screw extruder | | | |
| | Screw arrangement | | Type A | Type A | Type B | Type A | Type B | Type A |
| | Barrel set temperature | °C. | 210 | 210 | 210 | 290 | 210 | 290 |
| | Difference between kneading temperature and the highest glass transition temperature of resin among those used | °C. | 5 | 5 | 5 | 85 | 5 | 85 |
| | Chaotic mixing | | Present | Present | Absent | Absent | Absent | Absent |
| Phase structure (pellet) | Structure | | Dispersion structure | Dispersion structure | Dispersion structure | Dispersion structure | Dispersion structure | Dispersion structure |
| | Glass transition temperature | | Plural | Plural | Plural | Plural | Plural | Plural |
| | Average particle size | μm | 0.17 | 0.22 | 1.20 | 1.15 | 1.42 | 1.33 |
| | Peak half width (a) | nm$^{-1}$ | 0.00700 | 0.00590 | No peak | No peak | No peak | No peak |
| | Peak maximum avenumber (b) | nm$^{-1}$ | 0.00585 | 0.00455 | | | | |
| | (a)/(b) | | 1.20 | 1.30 | | | | |
| | Form | | b | b | c | c | c | c |
| Properties | Heat resistance (DTUL) | °C. | 151 | 170 | 136 | 135 | 153 | 154 |
| | Tensile strength | MPa | 77 | 76 | 72 | 70 | 72 | 72 |
| | Tensile elongation | % | 102 | 98 | 39 | 42 | 30 | 32 |

Even when polymer alloys were obtained by compounding a combination of immiscible thermoplastic resins, compounding under chaotic mixing conditions made it possible to make the average particle size very small and to reduce the (a)/(b) value, which was calculated from the peak half width (a) and the maximum wavenumber (b) of the peak to 1.5 or less so that polymer alloys having high uniformity of particles dispersed therein were successfully obtained.

The results in Table 6 show that polymer alloys having a very small average particle size and high uniformity of particles dispersed therein were successfully obtained. These polymer alloys have significantly improved heat resistance and good mechanical properties including good tensile elongation, as compared with polymer alloys obtained by conventional compounding methods without chaotic mixing.

INDUSTRIAL APPLICABILITY

The polymer alloy producing method enables sophisticated control of the structure of the dispersed phase of polymer alloys. The polymer alloy producing method also makes it possible to form a special alloy structure with a sophisticated structure of dispersed phase or to form immiscible-type polymer alloys in which the dispersed particles are controlled to be highly uniform and sophisticated. As a result, polymer alloys with a high level of heat resistance, mechanical properties, and transparency can be obtained. Taking advantage of such properties, polymer alloys obtained by the polymer alloy producing method can be effectively used as structural materials or transparent materials.

The polymer alloy can form a molded product that also has transparency while maintaining the original good heat resistance and mechanical properties of the resins blended. Taking advantage of a high level of heat resistance, mechanical properties, and transparency, therefore, the polymer alloy can be effectively used to form a variety of molded products.

The invention claimed is:

1. A method for producing a polymer alloy, comprising: compounding at least two or more components of thermoplastic resins by chaotic mixing at a temperature of 1 to 70° C. higher than a glass transition temperature of a resin having the highest glass transition temperature wherein the chaotic mixing is such that a logarithm of hypothetical elongation: (ln L/L$_0$), wherein (L) and (L$_0$) represent the length of a line and the initial length of the line respectively, in a particle tracking method, is 2 or more.

2. The method according to claim 1, wherein the thermoplastic resins are at least two or more components of immiscible thermoplastic resins.

3. The method according to claim 1, wherein the compounding by chaotic mixing is performed using a biaxial screw extruder.

* * * * *